US012208978B2

(12) United States Patent
Iori et al.

(10) Patent No.: US 12,208,978 B2
(45) Date of Patent: Jan. 28, 2025

(54) PAPER SHEET FEEDING APPARATUS AND BOX MAKING MACHINE

(71) Applicant: MITSUBISHI HEAVY INDUSTRIES MACHINERY SYSTEMS, LTD., Hyogo (JP)

(72) Inventors: Shinya Iori, Hyogo (JP); Kazushige Kurokawa, Hyogo (JP); Makoto Shimohatsubo, Hyogo (JP); Yasunari Suzuki, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 307 days.

(21) Appl. No.: 17/774,499

(22) PCT Filed: Sep. 16, 2020

(86) PCT No.: PCT/JP2020/035149
§ 371 (c)(1),
(2) Date: May 5, 2022

(87) PCT Pub. No.: WO2021/090586
PCT Pub. Date: May 14, 2021

(65) Prior Publication Data

US 2022/0388793 A1 Dec. 8, 2022

(30) Foreign Application Priority Data

Nov. 8, 2019 (JP) ................................ 2019-203294

(51) Int. Cl.
*B65H 1/06* (2006.01)
*B31B 50/06* (2017.01)
(Continued)

(52) U.S. Cl.
CPC ............ *B65H 1/06* (2013.01); *B31B 50/064* (2017.08); *B31B 50/262* (2017.08); *B65H 3/063* (2013.01)

(58) Field of Classification Search
CPC .... B65H 3/063; B65H 3/0607; B65H 3/0669; B65H 2601/12; B65H 2601/121
See application file for complete search history.

(56) References Cited

U.S. PATENT DOCUMENTS 4,681,311 A * 7/1987 Sardella .................. B65H 3/08 271/118
4,828,244 A * 5/1989 Sardella .................. B65H 3/34 271/118

(Continued)

FOREIGN PATENT DOCUMENTS

CN 106715296 A 5/2017
CN 108819470 A 11/2018

(Continued)

OTHER PUBLICATIONS

International Search Report and Written Opinion of International Application No. PCT/JP2020/035149 mailed Nov. 17, 2020; 10pp.

(Continued)

*Primary Examiner* — Patrick Cicchino
(74) *Attorney, Agent, or Firm* — HAUPTMAN HAM, LLP

(57) ABSTRACT

Provided in a paper sheet feeding apparatus and a box making machine are: a plurality of wheels capable of supplying a sheet by coming into contact with a lower surface of the sheet; a grate liftable and lowerable to an ascending position positioned above upper edges of the plurality of wheels and a descending position positioned below the upper edges of the plurality of wheels; a drive motor; an elevating device capable of lifting the grate to the ascending position by rotating the drive motor in one (Continued)

direction and capable of lowering the grate to the descending position by rotating the drive motor in the other direction; and a control device capable of adjusting an amount by which the grate is lifted and lowered by the elevating device by controlling the drive motor.

10 Claims, 8 Drawing Sheets

(51) Int. Cl.
*B31B 50/26* (2017.01)
*B65H 3/06* (2006.01)

(56) References Cited

U.S. PATENT DOCUMENTS

| | | | | | |
|---|---|---|---|---|---|
| 5,074,539 | A | * | 12/1991 | Wells | B65H 3/126 271/99 |
| 5,184,811 | A | * | 2/1993 | Sardella | B65H 3/063 271/118 |
| 5,531,432 | A | * | 7/1996 | Sardella | B65H 5/023 271/12 |
| 7,635,124 | B2 | * | 12/2009 | Sardella | B65H 3/126 271/99 |
| 9,162,834 | B1 | * | 10/2015 | Lee | B65H 3/126 |
| 9,701,498 | B2 | * | 7/2017 | Kodama | B65H 3/0607 |
| 9,840,385 | B2 | * | 12/2017 | Kodama | B65H 3/34 |
| 10,343,861 | B2 | * | 7/2019 | Nadachi | B65H 3/34 |
| 10,407,261 | B2 | | 9/2019 | Tsukasaki | |
| 10,494,212 | B2 | * | 12/2019 | Kodama | B31B 50/26 |
| 10,822,188 | B2 | * | 11/2020 | Kodama | B65H 33/08 |
| 11,897,716 | B2 | * | 2/2024 | Schlothauer | B65H 5/021 |
| 2016/0200532 | A1 | * | 7/2016 | Kodama | B65H 7/18 271/10.12 |
| 2017/0057766 | A1 | * | 3/2017 | Kodama | B65H 7/20 |
| 2017/0152117 | A1 | | 6/2017 | Tsukasaki | |
| 2018/0009616 | A1 | * | 1/2018 | Kodama | B31B 50/062 |

FOREIGN PATENT DOCUMENTS

| | | | | | |
|---|---|---|---|---|---|
| JP | H07241638 | A | | 9/1995 | |
| JP | H08268583 | A | * | 10/1996 | |
| JP | 2009249152 | A | | 10/2009 | |
| JP | 2014101171 | A | * | 6/2014 | |
| JP | 2016050071 | A | | 4/2016 | |
| JP | 2016098050 | A | * | 5/2016 | B65H 1/06 |
| JP | 2016128355 | A | | 7/2016 | |
| JP | 2017165532 | A | | 9/2017 | |
| JP | 2018002356 | A | | 1/2018 | |
| JP | 6415993 | B2 | | 10/2018 | |
| WO | WO-2018155533 | A1 | * | 8/2018 | B31B 50/06 |

OTHER PUBLICATIONS

Extended European Search Report for European Application No. 20884648.5 mailed May 2, 2023; 8pp.

* cited by examiner

PAPER SHEET FEEDING APPARATUS AND BOX MAKING MACHINE

RELATED APPLICATIONS

The present application is a National Phase of International Application Number PCT/JP2020/035149 filed Sep. 16, 2020 and claims priority of Japanese Application Number 2019-203294 filed Nov. 8, 2019.

TECHNICAL FIELD

The present disclosure relates to a paper sheet feeding apparatus for ejecting a cardboard sheet or the like and a box making machine provided with a paper sheet feeding apparatus.

BACKGROUND ART

A box making machine manufactures a box body (corrugated box) by processing a cardboard sheet. The box making machine is configured by a feeding section, a printing section, a slotter creaser section, a die cutting section, a folding section, and a counter-ejector section. In the feeding section, cardboard sheets stacked on a table are ejected one by one and sent to the printing section. In the printing section, which has a plurality of printing units, printing is performed on the cardboard sheet. In the slotter creaser section, a creasing line as a fold line is formed on the printed cardboard sheet and processing is performed for a flap formation groove and a glue flap for joining. In the die cutting section, punching for a hand hole or the like is performed on the cardboard sheet with the creasing line, groove, and glue flap formed. In the folding section, glue application to the glue flap, folding along the creasing line, and glue flap joining are performed while the cardboard sheet is moved. A flat corrugated box is manufactured as a result. In the counter-ejector section, the corrugated boxes are stacked, sorted into a predetermined number of batches, and discharged.

The feeding section has a plurality of wheels and a grate. The cardboard sheets are stacked on the feed table. The plurality of wheels and the grate are disposed downstream of the feed table in the transport direction of the cardboard sheet. A front guide and a feed roll are disposed on the downstream side of the plurality of wheels and the grate. The wheel protrudes slightly above the grate when the grate is at a descending position. Accordingly, the rotating wheel comes into contact with the lower surface of the cardboard sheet on the feed table and the cardboard sheet is ejected. The grate moves to an ascending position when the leading edge portion of the cardboard sheet reaches the feed roll beyond the front guide. Then, the grate is positioned slightly above the wheel. Accordingly, the wheel does not come into contact with the lower surface of the next cardboard sheet on the feed table and overlapping cardboard sheet ejection is prevented.

Examples of such a paper sheet feeding apparatus for cardboard sheets include the apparatus that is described in PTL 1. In the paper sheet feeding apparatus for cardboard sheets described in PTL 1, a motion conversion mechanism converts drive motor rotation in one direction into a motion for lifting and lowering a lifting/lowering member (grate) to lift and lower the lifting/lowering member.

CITATION LIST

Patent Literature

[PTL 1] Japanese Patent No. 6415993

SUMMARY OF INVENTION

Technical Problem

The wheel wears due to long-term use. As the wheel wears, the outer diameter of the wheel decreases and the height of the wheel in relation to the grate changes. Then, the outer peripheral portion of the wheel cannot be positioned above the grate and the wheel may be incapable of cardboard sheet ejection even if the grate moves to the descending position. Accordingly, the descending position of the grate needs to be adjusted in accordance with the amount of wear of the wheel. In the above paper sheet feeding apparatus for cardboard sheets of the related art, the lifting/lowering member (grate) is moved to the ascending position and the descending position by rotating the drive motor in one direction and stopping the drive motor at a predetermined position. This is disadvantageous in that it is difficult to adjust the descending position of the grate.

The present disclosure is to solve the above problem, and an object of the present disclosure is to provide a paper sheet feeding apparatus and a box making machine capable of facilitating grate stop position adjustment.

Solution to Problem

A paper sheet feeding apparatus of the present disclosure for achieving the above object includes: a plurality of wheels capable of supplying a sheet by coming into contact with a lower surface of the sheet; a grate liftable and lowerable to an ascending position positioned above upper edges of the plurality of wheels and a descending position positioned below the upper edges of the plurality of wheels; a drive motor; an elevating device capable of lifting the grate to the ascending position by rotating the drive motor in one direction and capable of lowering the grate to the descending position by rotating the drive motor in the other direction; and a control device capable of adjusting an amount by which the grate is lifted and lowered by the elevating device by controlling the drive motor.

A box making machine of the present disclosure includes: a feeding section where a box making sheet material is supplied; a printing section where printing is performed on the box making sheet material; a slotter creaser section where creasing line processing and grooving are performed on a surface of the box making sheet material; a folding section where a box body is formed by folding the box making sheet material and joining an end portion; and a counter-ejector section where every predetermined number of the box bodies are discharged after the box bodies are stacked while being counted, in which the paper sheet feeding apparatus described above is applied as the feeding section.

Advantageous Effects of Invention

According to the paper sheet feeding apparatus and the box making machine of the present disclosure, the stop position of the grate can be adjusted with ease.

DESCRIPTION OF EMBODIMENTS

Hereinafter, a preferred embodiment of the present disclosure will be described in detail with reference to the drawings. The present disclosure is not limited by this embodiment. In a case where there are a plurality of embodiments, a combination of the embodiments is also included in the present disclosure. In addition, components in the embodiment include those that can be easily assumed by those skilled in the art, those that are substantially the same, and those in a so-called equal range.

[Box Making Machine]

Figure 1:
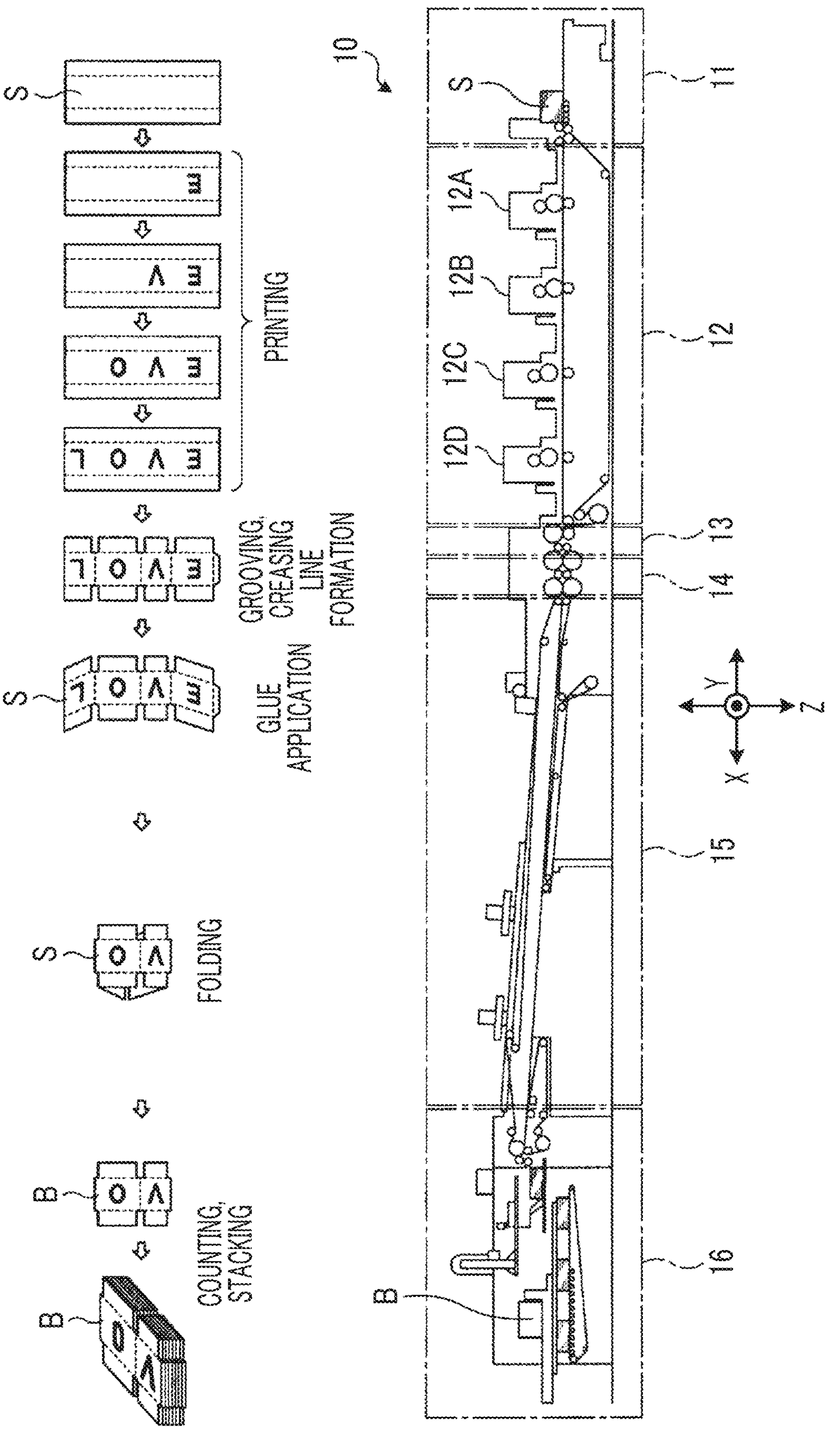
FIG. 1 is a schematic configuration diagram illustrating a box making machine of the present embodiment.

FIG. 1 is a schematic configuration diagram illustrating a box making machine of the present embodiment. In the following description, the front-rear direction in the transport direction of a cardboard sheet is the X direction, the horizontal direction orthogonal to the front-rear direction in the transport direction of the cardboard sheet (X direction) is the Y direction (width direction of the cardboard sheet), and the vertical direction orthogonal to the front-rear direction in the transport direction of the cardboard sheet (X direction) is the Z direction (thickness direction of the cardboard sheet).

As illustrated in FIG. 1, in the present embodiment, a box making machine 10 manufactures a corrugated box (box making sheet material) B by processing a cardboard sheet S. The box making machine 10 includes a feeding section (paper sheet feeding apparatus) 11, a printing section 12, a slotter creaser section 13, a die cutting section 14, a folding section 15, and a counter-ejector section 16. The feeding section 11, the printing section 12, the slotter creaser section 13, the die cutting section 14, the folding section 15, and the counter-ejector section 16 are disposed in a straight line along the direction in which the cardboard sheet S and the corrugated box B are transported (X direction).

Multiple cardboard sheets S are loaded in the feeding section 11 by sequentially carrying in the plate-shaped cardboard sheets S. The feeding section 11 ejects the cardboard sheets S one by one to supply the cardboard sheets S to the printing section 12 at a constant speed. In the printing section 12, multicolor printing (four-color printing in the present embodiment) is performed on the surface of the cardboard sheet S. In the printing section 12, four printing units 12A, 12B, 12C, and 12D are disposed in series. The printing units 12A, 12B, 12C, and 12D perform printing on the surface of the cardboard sheet S using four types of ink colors. In the slotter creaser section 13, creasing line processing and grooving are performed on the cardboard sheet S.

In the die cutting section 14, punching (e.g. hand hole) is performed on the cardboard sheet S. In the folding section 15, the cardboard sheet S is folded while being moved in the transport direction and both end portions in the width direction are joined to form the flat corrugated box B. In the counter-ejector section 16, the corrugated boxes B manufactured in the folding section 15 are stacked while being counted and then sorted into a predetermined number of batches and discharged.

[Feeding Section]

Figure 2:
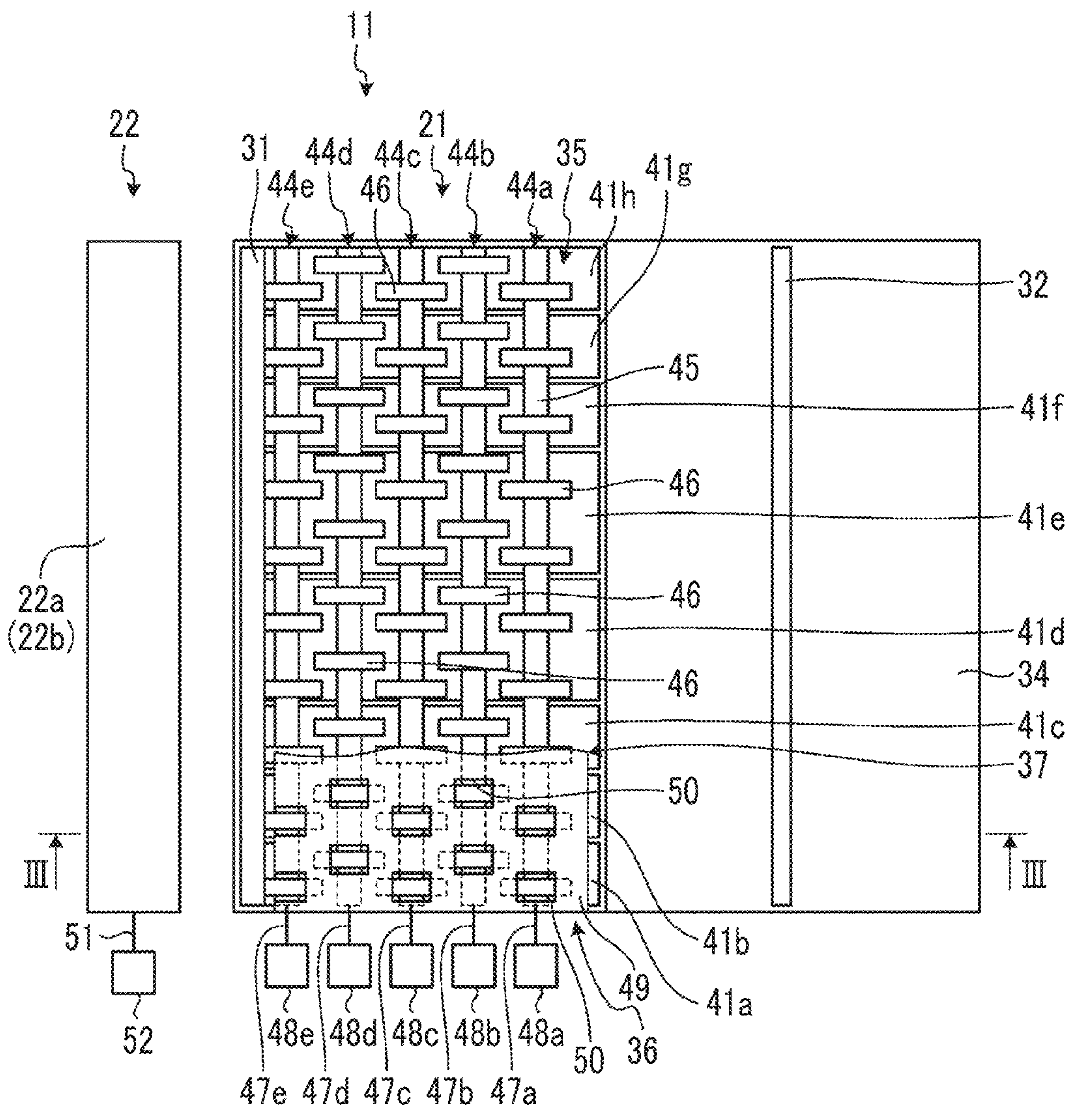
FIG. 2 is a schematic plan view illustrating a feeding section of the present embodiment.
Figure 3:
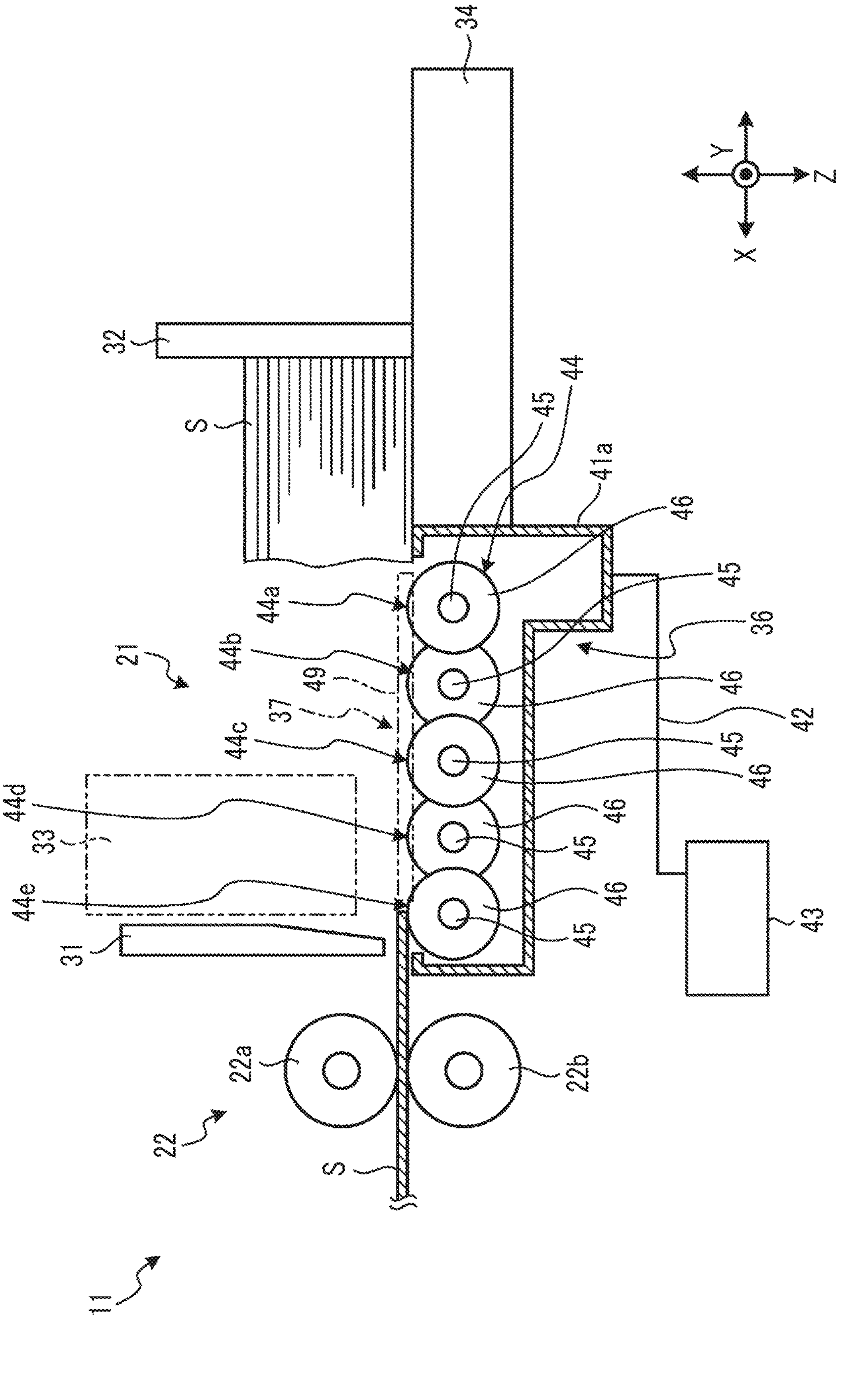
FIG. 3 is a schematic side view illustrating the feeding section.

Here, the feeding section 11 will be described in detail. FIG. 2 is a schematic plan view illustrating the feeding section of the present embodiment, and FIG. 3 is a schematic side view illustrating the feeding section. In FIG. 2, a plurality of wheels are represented by solid lines by cutting out a part of a ceiling portion and a part of a grate. In addition, in FIG. 3, the grate is represented by a two-dot chain line.

The feeding section 11 includes a transport portion 21 and a feed roll 22, and the feed roll 22 is disposed on the downstream side of the transport portion 21 in the transport direction of the cardboard sheet S (X direction).

The transport portion 21 includes a front guide 31, a back stop 32, side guides 33, a feed table 34, a wheel assembly 35, a suction portion 36, and a grate device 37.

The cardboard sheet S is carried into the transport portion 21 from the transport device (not illustrated) of the previous process. In the transport portion 21, the front guide 31 is disposed on the downstream side in the X direction and the back stop 32 is disposed on the upstream side in the X direction. The side guides 33 are disposed on both sides in the Y direction between the front guide 31 and the back stop 32. The feed table 34, the wheel assembly 35, and the suction portion 36 are disposed between the front guide 31 and the back stop 32 and between the left and right side guides 33.

The leading edge portion of the cardboard sheet S that is carried in abuts against the front guide 31. The rear end portion of the cardboard sheet S that is carried in and abuts against the front guide 31 abuts against the back stop 32. The cardboard sheet S falls onto the feed table 34 with the front and rear end portions of the cardboard sheet S guided by the front guide 31 and the back stop 32, and the X-direction position of the cardboard sheet S is aligned as a result. In addition, the left and right side portions of the cardboard sheet S abut against the left and right side guides 33. The cardboard sheet S falls onto the feed table 34 with the left and right side portions of the cardboard sheet S guided by the left and right side guides 33, and the Y-direction position of the cardboard sheet S is aligned as a result. In other words, the cardboard sheet S is sequentially stacked on the feed table 34 by falling while being guided by the front guide 31, the back stop 32, and the side guides 33.

The wheel assembly 35, the suction portion 36, and the grate device 37 are disposed downstream of the feed table 34 in the X direction. The wheel assembly 35, the suction portion 36, and the grate device 37 are disposed below the cardboard sheet S that is at the lowest position among those stacked on the feed table 34. In the suction portion 36, a plurality of (8 in the present embodiment) suction boxes 41*a*, 41*b*, 41*c*, 41*d*, 41*e*, 41*f*, 41*g*, and 41*h* are disposed in series along the Y direction. The suction boxes 41*a*, 41*b*, 41*c*, 41*d*, 41*e*, 41*f*, 41*g*, and 41*h* are connected to a suction blower 43 via a duct 42. When the suction blower 43 is driven, a suction force can be applied to the suction boxes 41*a*, 41*b*, 41*c*, 41*d*, 41*e*, 41*f*, 41*g*, and 41*h* via the duct 42.

The wheel assembly 35 is disposed in the suction boxes 41*a*, 41*b*, 41*c*, 41*d*, 41*e*, 41*f*, 41*g*, and 41*h*. In the wheel assembly 35, a plurality of rows (5 rows in the present embodiment) of wheels 44*a*, 44*b*, 44*c*, 44*d*, and 44*e* are accommodated side by side along the X direction. The wheels 44*a*, 44*b*, 44*c*, 44*d*, and 44*e* have the same configuration and are configured by fixing a plurality of wheel main bodies 46 to rotary shafts 45. The wheels 44*a*, 44*b*, 44*c*, 44*d*, and 44*e* are disposed such that the wheel main bodies 46 are along the X direction and out of line in the Y direction.

The rotary shafts 45 are disposed along the Y direction and penetrate the side walls of the suction boxes 41*a*, 41*b*, 41*c*, 41*d*, 41*e*, 41*f*, 41*g*, and 41*h*. Each end portion of the rotary shaft 45 is rotatably supported. The plurality of wheel main bodies 46 are fixed to the rotary shaft 45 at predetermined intervals in the Y direction. The plurality of wheel main bodies 46 slightly protrude upward in the Z direction beyond the upper surface of the feed table 34. As for the wheels 44*a*, 44*b*, 44*c*, 44*d*, and 44*e*, the plurality of wheel main bodies 46 are disposed out of line in the Y direction. As for the wheels 44*a*, 44*c*, and 44*e*, the wheel main bodies 46 are disposed at the same positions in the Y direction. As for the wheels 44*b* and 44*d*, the wheel main bodies 46 are disposed at the same positions in the Y direction. As for the wheels 44*a*, 44*c*, and 44*e* and the wheels 44*b* and 44*d*, the wheel main bodies 46 are disposed out of line by a predetermined pitch in the Y direction. In other words, the plurality of wheel main bodies 46 are disposed in a houndstooth pattern.

Drive motors 48*a*, 48*b*, 48*c*, 48*d*, and 48*e* are connected to the wheels 44*a*, 44*b*, 44*c*, 44*d*, and 44*e* via power transmission mechanisms 47*a*, 47*b*, 47*c*, 47*d*, and 47*e*, respectively. The drive motors 48*a*, 48*b*, 48*c*, 48*d*, and 48*e* are servo motors. When the drive motors 48*a*, 48*b*, 48*c*, 48*d*, and 48*e* are driven, the wheels 44*a*, 44*b*, 44*c*, 44*d*, and 44*e* can be synchronously rotated via the power transmission mechanisms 47*a*, 47*b*, 47*c*, 47*d*, and 47*e*. In addition, by performing drive control on the drive motors 48*a*, 48*b*, 48*c*, 48*d*, and 48*e*, the wheels 44*a*, 44*b*, 44*c*, 44*d*, and 44*e* can be rotated synchronously and intermittently.

The grate device 37 has a grate 49. The grate 49 is disposed above the suction boxes 41*a*, 41*b*, 41*c*, 41*d*, 41*e*, 41*f*, 41*g*, and 41*h* in the suction portion 36 and the wheels 44*a*, 44*b*, 44*c*, 44*d*, and 44*e* in the wheel assembly 35. The grate 49 is a grid-shaped table where a plurality of opening portions 50 are formed. As for the grate 49, the plurality of opening portions 50 are formed at the upper positions that face the plurality of wheel main bodies 46. A part of the outer peripheral portion of each wheel main body 46 is capable of protruding upward in the Z direction from the opening portion 50 of the grate 49. The grate 49 can be lifted and lowered to an ascending position and a descending position by an elevating device 82 (see FIG. 4), which will be described later. Here, the ascending position of the grate 49 is where the upper surface of the grate 49 is above the upper edge of the outer peripheral portion of each wheel main body 46. The descending position of the grate 49 is where the upper surface is below the upper edge of the outer peripheral portion of each wheel main body 46.

When the grate 49 is at the ascending position, the upper edge of each wheel main body 46 is positioned below the upper surface of the grate 49. At this time, each wheel main body 46 is separated downward from the lower surface of the cardboard sheet S. When the grate 49 is at the descending position, the upper edge of each wheel main body 46 is positioned so as to protrude above the upper surface of the grate 49 through the opening portion 50. At this time, each wheel main body 46 is capable of coming into contact with the lower surface of the cardboard sheet S.

Accordingly, when the drive motors 48*a*, 48*b*, 48*c*, 48*d*, and 48*e* are driven, the wheels 44*a*, 44*b*, 44*c*, 44*d*, and 44*e* of the wheel assembly 35 rotate synchronously. When the suction blower 43 is driven, a suction force acts on the suction boxes 41*a*, 41*b*, 41*c*, 41*d*, 41*e*, 41*f*, 41*g*, and 41*h*. When the grate 49 moves to the descending position in this state, each wheel main body 46 comes into contact with the lower surface of the cardboard sheet S that is at the lowest position on the feed table 34. At this time, the suction force acts on the lower surface of the cardboard sheet S to increase frictional resistance in relation to each wheel main body 46. Then, the cardboard sheet S is supplied to the downstream side from the gap formed below the front guide 31 by the plurality of rotating wheel main bodies 46.

The feed roll 22 includes an upper feed roll 22*a* and a lower feed roll 22*b*. The feed roll 22 is disposed downstream of the front guide 31 in the X direction. A drive motor 52 is connected to the lower feed roll 22*b* via a power transmission mechanism 51. When the drive motor 52 is driven, the lower feed roll 22*b* can be rotated via the power transmission mechanism 51. The upper feed roll 22*a* is disposed above the lower feed roll 22*b* so as to face the lower feed roll 22*b*. The upper feed roll 22*a* rotates by the cardboard sheet S being transported by the lower feed roll 22*b*.

Accordingly, the lower feed roll 22*b* rotates when the drive motor 52 is driven. Then, the cardboard sheet S supplied from the transport portion 21 is sandwiched above and below by the upper feed roll 22*a* and the lower feed roll 22*b* and is supplied toward the printing section 12 (see FIG. 1) on the downstream side.

[Grate Device]

Figure 4:
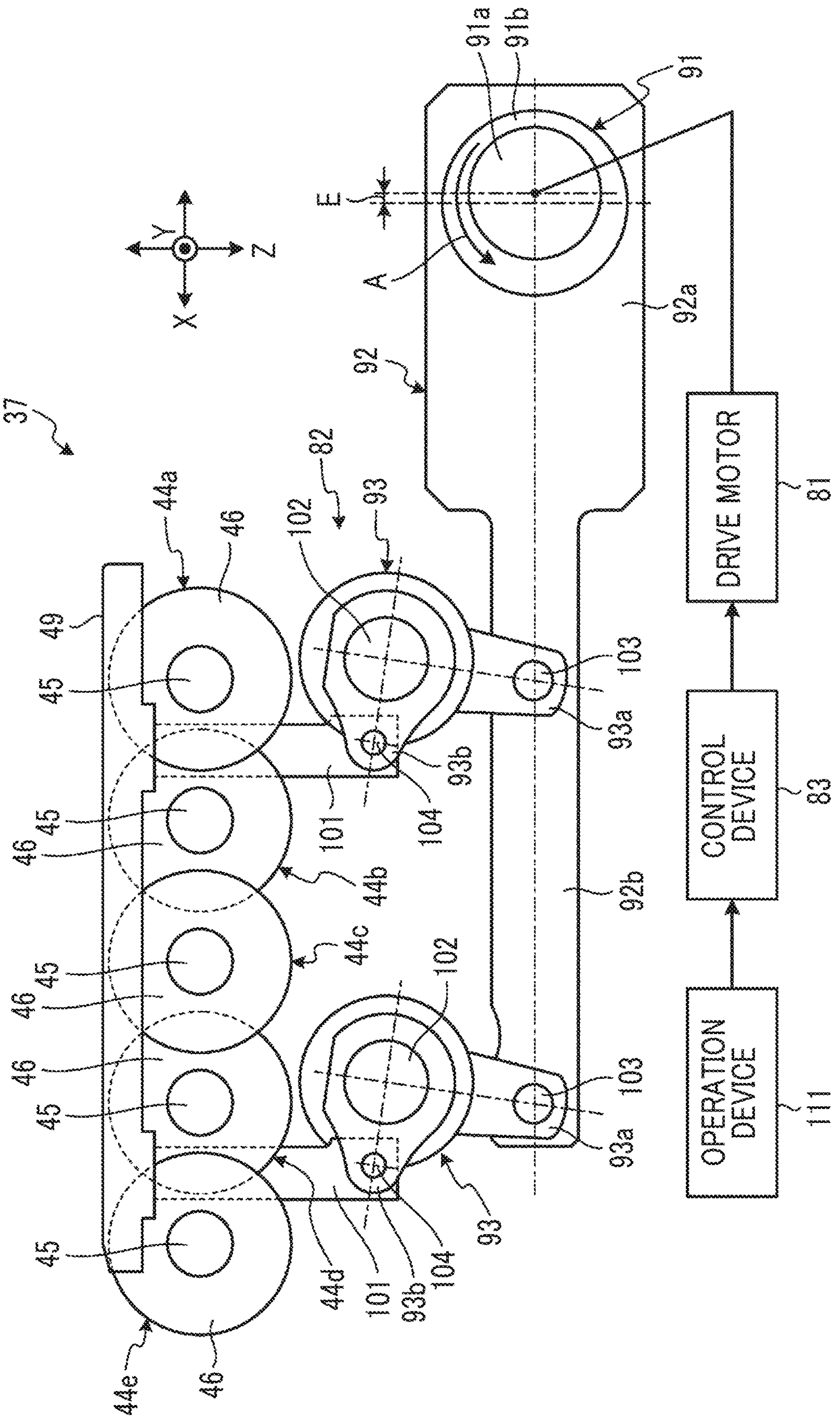
FIG. 4 is a schematic diagram illustrating a grate device.
Figure 5:
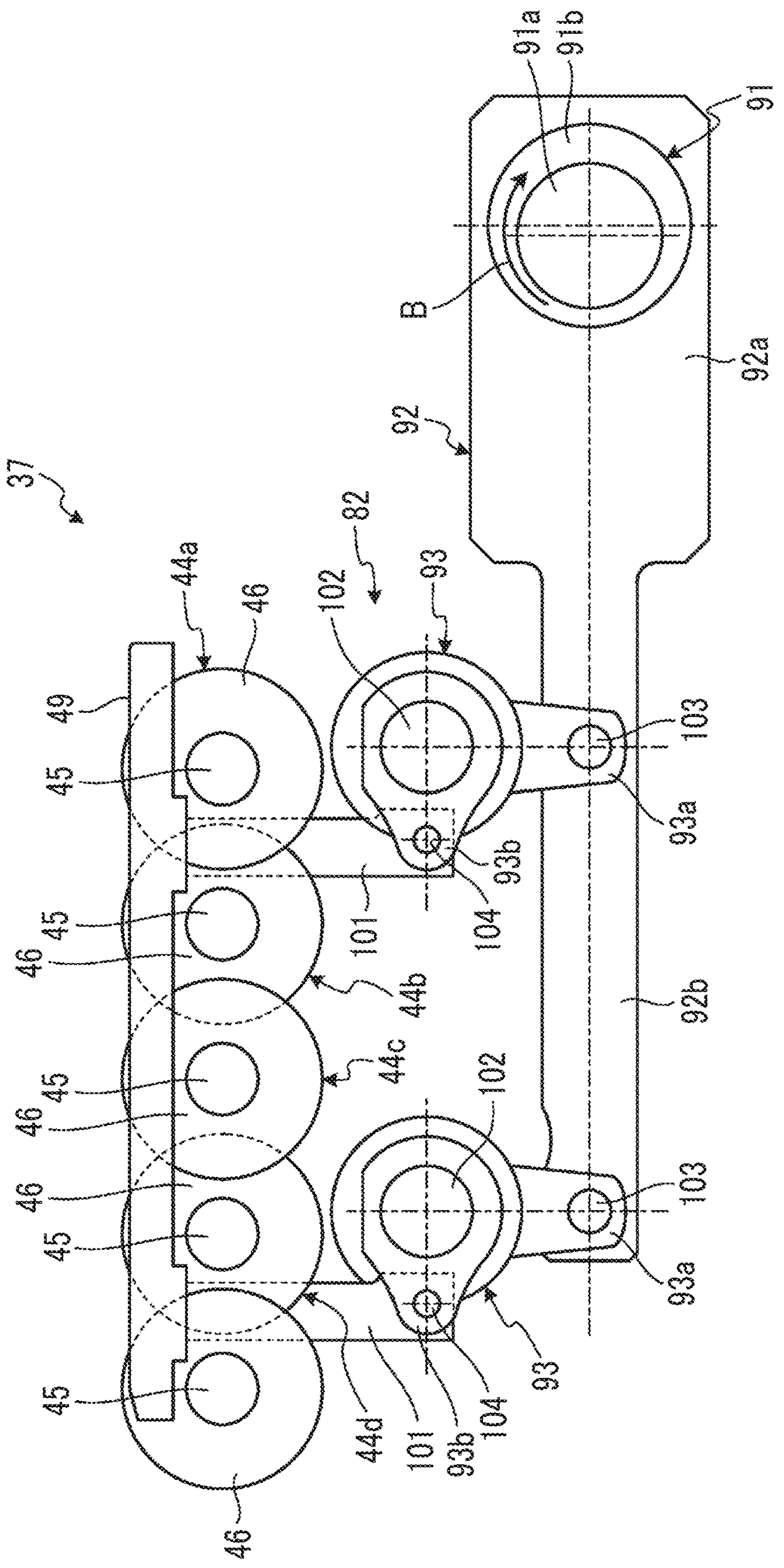
FIG. 5 is a schematic diagram for describing the operation of the grate device.

Hereinafter, the grate device 37 will be described in detail. FIG. 4 is a schematic diagram illustrating the grate device, and FIG. 5 is a schematic diagram for describing the operation of the grate device.

As illustrated in FIG. 4, the grate device 37 includes the grate 49, a drive motor 81, the elevating device 82, and a control device 83.

The grate 49 has the plurality of opening portions 50 (see FIG. 2) as described above. The grate 49 can be lifted and lowered to the ascending position positioned above the upper edges of the wheel main bodies 46 of the plurality of wheels 44*a*, 44*b*, 44*c*, 44*d*, and 44*e* and the descending position positioned below the upper edges of the wheel main bodies 46. The drive motor 81 is a servo motor. The elevating device 82 is capable of lifting the grate 49 to the ascending position by rotating the drive motor 81 in one direction and is capable of lowering the grate 49 to the descending position by rotating the drive motor 81 in the other direction. The control device 83 is capable of lifting and lowering the grate 49 between the ascending position and the descending position by controlling the drive motor 81 and is capable of adjusting the amount by which the grate 49 is lifted and lowered by the elevating device 82.

The elevating device 82 has an eccentric shaft 91, a drive rod 92, and a plurality of (2 in the present embodiment) link members 93. A plurality of (2 in the present embodiment) connecting rods 101 are fixed to the lower surface portion of the grate 49. The connecting rod 101 is disposed along the Z direction and has an upper end portion fixed to the lower surface of the grate 49. The drive rod 92 is disposed along the X direction. The eccentric shaft 91 is fitted and connected to the attachment hole of a base end portion 92*a* of the drive rod 92. The eccentric shaft 91 is configured such that an eccentric part 91*b* is integrally formed on the outer peripheral portion of a rotary shaft portion 91*a*. The output shaft of the drive motor 81 is connected to the eccentric shaft 91. The eccentric shaft 91 rotates integrally with the output shaft of the drive motor 81. A deceleration mechanism or the like may be interposed between the output shaft of the drive motor 81 and the eccentric shaft 91.

The two link members 93 are interposed between the grate 49 and the drive rod 92. Each link member 93 has an L shape in a side view. The link members 93 have the same shape and are disposed at a predetermined interval in the X direction. Each link member 93 has a first arm portion 93*a* extending downward and a second arm portion 93*b* extending laterally. Each link member 93 is rotatably supported in, for example, the suction portion 36 (see FIG. 3) by a supporting shaft 102, which is along the Y direction. The first arm portion 93*a* of each link member 93 is rotatably supported by a connection shaft 103 in the other end portion 92*b* of the drive rod 92. The second arm portion 93*b* of each link member 93 is rotatably supported by a connection shaft 104 in the lower end portion of the connecting rod 101.

Accordingly, when the drive motor 81 is driven, the eccentric shaft 91 rotates and the drive rod 92 moves in the X direction by an eccentricity amount E of the eccentric shaft 91. At this time, the amount of linear motion of the drive rod 92 generated by the drive motor 81 rotating the eccentric shaft 91 is converted into the lifting/lowering amount of the grate 49 by each link member 93 and the grate is lifted and lowered. In other words, the state illustrated in FIG. 4 is a state where the grate 49 is positioned at the ascending position. When the grate 49 is at the ascending position, the upper surface of the grate 49 is positioned above the upper edges of the wheel main bodies 46 in the plurality of wheels 44*a*, 44*b*, 44*c*, 44*d*, and 44*e*.

From this state, the drive motor 81 rotates the eccentric shaft 91 by 180 degrees in the A direction (the other direction). Then, the drive rod 92 moves to one side in the X direction (to the right in FIG. 4) by the eccentricity amount E of the eccentric shaft 91. When the drive rod 92 moves to the side in the X direction, each link member 93 rotates around the supporting shaft 102 in the counterclockwise direction by a predetermined angle in FIG. 4. When each link member 93 rotates in the counterclockwise direction, the grate 49 descends to the descending position via each connecting rod 101 as illustrated in FIG. 5. The state illustrated in FIG. 5 is a state where the grate 49 is positioned at the descending position. When the grate 49 is at the descending position, the upper surface of the grate 49 is positioned below the upper edges of the wheel main bodies 46 in the plurality of wheels 44*a*, 44*b*, 44*c*, 44*d*, and 44*e*.

From this state, the drive motor 81 rotates the eccentric shaft 91 by 180 degrees in the B direction (one direction). Then, the drive rod 92 moves to the other side in the X direction (to the left in FIG. 5) by the eccentricity amount E of the eccentric shaft 91. When the drive rod 92 moves to the side in the X direction, each link member 93 rotates around the supporting shaft 102 in the clockwise direction by a predetermined angle in FIG. 5. When each link member 93 rotates in the clockwise direction, the grate 49 ascends to the ascending position via each connecting rod 101 as illustrated in FIG. 4. The state illustrated in FIG. 4 is a state where the grate 49 is positioned at the ascending position.

Figure 6:
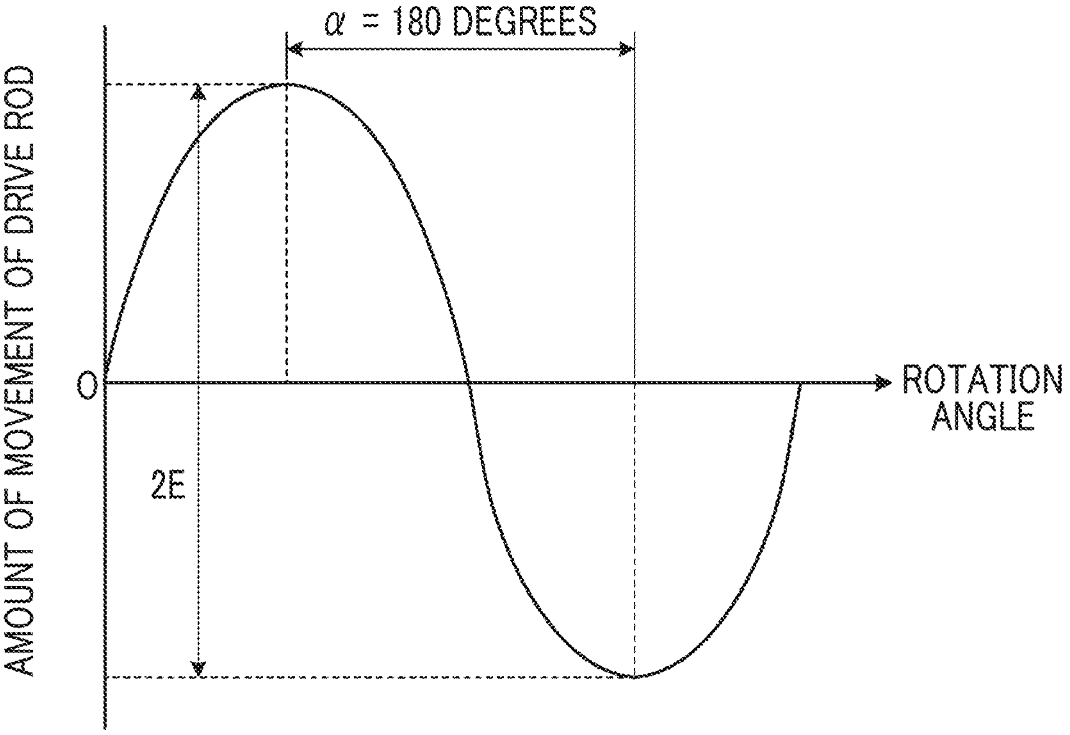
FIG. 6 is a graph illustrating the amount of movement of a drive rod with respect to the rotation angle of an eccentric shaft.

FIG. 6 is a graph illustrating the amount of movement of the drive rod with respect to the rotation angle of the eccentric shaft. As illustrated in FIGS. 4 and 6, when the eccentric shaft 91 makes one rotation (360 degrees), the rotation angle of the eccentric shaft 91 and the amount of movement of the drive rod 92 are as illustrated in FIG. 6.

In the present embodiment, the control device 83 performs drive control on the drive motor 81, converts the amount of linear motion generated by the elevating device 82 rotating the eccentric shaft 91 in one direction (B direction) into the ascending amount of the grate 49, and converts the amount of linear motion generated by rotating the eccentric shaft 91 in the other direction (A direction) into the descending amount of the grate. In other words, since the eccentricity amount E of the eccentric shaft 91 is defined, the amount of movement of the drive rod 92 becomes a maximum eccentricity amount 2E when the eccentric shaft 91 rotates in the range of rotation angle $\alpha$=180 degrees.

Figure 7:
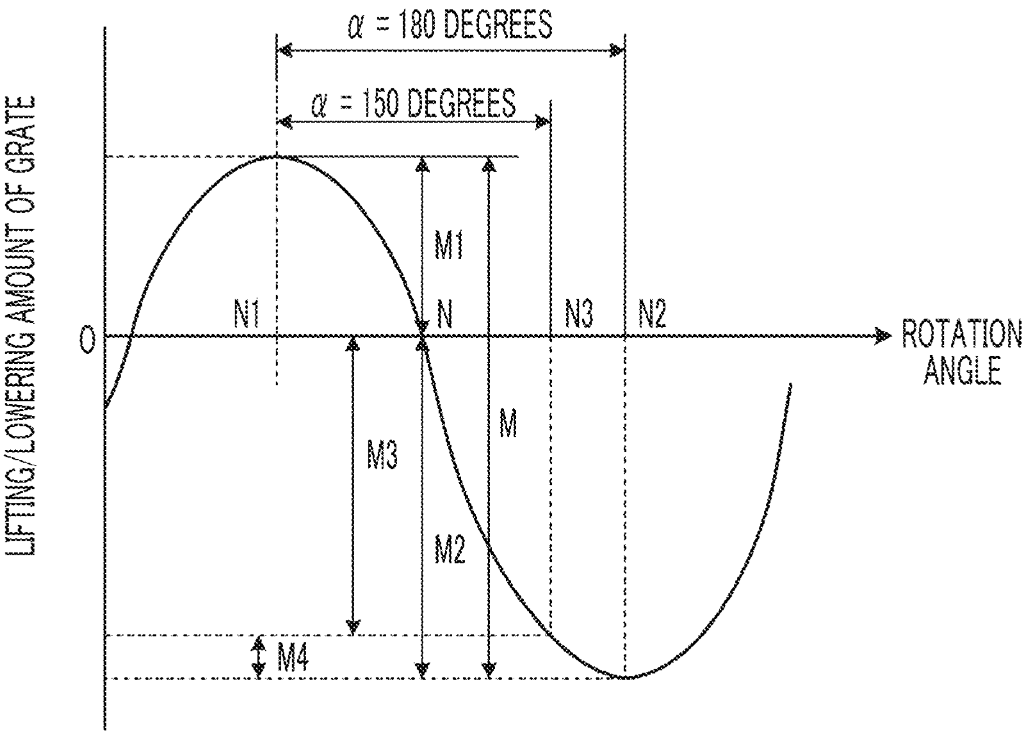
FIG. 7 is a graph illustrating the lifting/lowering amount of a grate with respect to the rotation angle of the eccentric shaft.

FIG. 7 is a graph illustrating the lifting/lowering amount of the grate with respect to the rotation angle of the eccentric shaft. As illustrated in FIGS. 4 and 7, since the amount of linear motion (2E) in the X direction resulting from the rotational motion of the eccentric shaft 91 is converted into the lifting/lowering amount of the grate 49, the maximum lifting/lowering amount of the grate 49 is M, which corresponds to the eccentricity amount 2E, when the eccentric shaft 91 rotates in the range of rotation angle $\alpha$=180 degrees.

An origin position O at a time when the grate 49 is lifted and lowered along the Z direction is, for example, where the upper surface of the grate 49 coincides with the upper edges of the wheel main bodies 46 in the plurality of wheels 44*a*, 44*b*, 44*c*, 44*d*, and 44*e*, and the rotation angle of the eccentric shaft 91 at this time is N. N1 is the rotation angle of the eccentric shaft 91 at a time when the grate 49 is positioned at the maximum ascending position, and N2 is the rotation angle of the eccentric shaft 91 at a time when the grate 49 is positioned at the maximum descending position. Then, at the rotation angle N1 of the eccentric shaft 91, the ascending amount from the origin position O at a time when the grate 49 is positioned at the maximum ascending position is M1. In addition, at the rotation angle N2 of the eccentric shaft 91, the descending amount from the origin position O at a time when the grate 49 is positioned at the maximum descending position is M2.

The wheel main bodies 46 constituting the wheels 44*a*, 44*b*, 44*c*, 44*d*, and 44*e* are worn as a result of long-term use. When the wheel main body 46 wears, the outer diameter of the wheel main body 46 decreases and the height of the wheel main body 46 in relation to the grate 49 changes. Accordingly, it is necessary to adjust at least the descending position of the grate 49 in accordance with the amount of wear of the wheel main body 46.

In the present embodiment, the ascending position where the grate 49 is positioned above the upper edge of the wheel main body 46 is set to the position where the eccentric shaft 91 is rotated by the rotation angle N1 to one direction side from the rotation angle N at the origin position O and the grate 49 is lifted by the ascending amount M1. In addition, the descending position where the grate 49 is positioned below the upper edge of the wheel main body 46 is set to the position where the eccentric shaft 91 is rotated by a rotation angle N3 to the other direction side from the rotation angle N at the origin position O and the grate 49 is lowered by a descending amount M3. Here, the rotation angle N3 of the eccentric shaft 91 is smaller than the rotation angle N2, the descending amount M3 of the grate 49 is smaller than the descending amount M2, and the difference between the descending amount M2 and the descending amount M3 is a descending amount M4.

Accordingly, although the maximum rotation angle $\alpha$ of the eccentric shaft 91 is 180 degrees, the rotation angle $\alpha$ for the grate 49 to be lifted and lowered between the ascending position and the descending position is set from the rotation angle N1 to the rotation angle N3, to 150 degrees as an example. The rotation angle from the rotation angle N3 to the rotation angle N2 is the descending amount M4 obtained by subtracting the descending amount M3 from the descending amount M2. In other words, the descending amount M4 is an adjustment amount for adjusting the descending position of the grate 49. The control device 83 controls the drive motor 81 to adjust the stop position of the eccentric shaft 91 on the other direction side between the rotation angle N3 and the rotation angle N2, and then the descending amount of the grate 49 caused by the elevating device 82 can be adjusted within the range of the descending amount M4. In other words, the rotation stop position of the eccentric shaft 91 is set between the rotation angle N3 and the rotation angle N2 based on the amount of wear of the wheel main body 46 and the descending amount of the grate 49 caused by the elevating device 82 is adjusted within the range of the descending amount M4.

In other words, when the wheel main body 46 is not worn, the ascending position of the grate 49 is where the grate 49 is lifted by the ascending amount M1 by rotating the eccentric shaft 91 in one direction to the rotation angle N1. In addition, the descending position of the grate 49 is where the grate 49 is lowered by the descending amount M3 by rotating the eccentric shaft 91 in the other direction to the rotation angle N3. The descending position of the grate 49 is adjusted when the wheel main body 46 wears due to long-term use. For example, the descending position of the grate 49 is changed to the position of lowering by descending amount M3+m, which is the descending amount M3 increased by a predetermined amount m, by rotating the eccentric shaft 91 in the other direction by a predetermined angle more than the rotation angle N3. At this time, the ascending position of the grate 49 may be changed. In other words, as for the ascending amount of the grate 49, an adjustment amount for adjusting the ascending position of the grate 49 may be ensured in the same manner as the descending amount of the grate 49.

Figure 8:
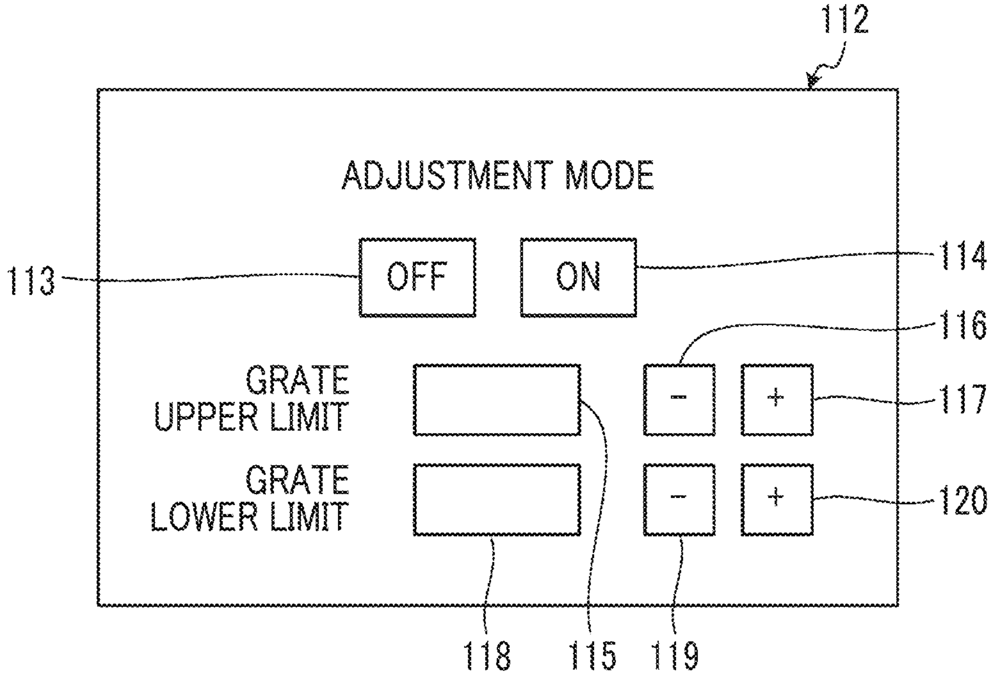
FIG. 8 is a schematic diagram illustrating the operation screen of the grate device.

FIG. 8 is a schematic diagram illustrating the operation screen of the grate device. As illustrated in FIG. 4, the control device 83 is provided with an operation device (input unit) 111 inputting the upper limit value to the ascending position from the origin position of the grate 49 and the lower limit value to the descending position from the origin position of the grate 49. As illustrated in FIG. 8, the operation device 111 has a set input screen 112. Here, an off button 113 is an adjustment mode end switch and an on button 114 is an adjustment mode start switch. In addition, a display unit 115 is the distance from the origin position to the grate upper limit (ascending position) and can be changed by a subtraction button 116 and an addition button 117. A display unit 118 is the distance from the origin position to the grate lower limit (descending position) and can be changed by a subtraction button 119 and an addition button 120. A worker sets the grate upper limit displayed on the display unit 115 by operating the adjustment mode on button 114 and operating the subtraction button 116 and the addition button 117. In addition, the worker sets the grate lower limit displayed on the display unit 118 by operating the subtraction button 119 and the addition button 120.

In addition, when the cardboard sheet S is carried from the transport device of the previous process into the transport portion 21 as illustrated in FIGS. 3 and 4, the control device 83 drives and controls the drive motor 81 to elevate the grate 49 above the lower end portion of the side guide 33 by the elevating device 82. The cardboard sheet S carried into the transport portion 21 is positioned in the X direction by the front guide 31 and the back stop 32 and is positioned in the Y direction by the side guide 33. At this time, a gap is formed between the lower end portion of the side guide 33 and the upper surface of the feed table 34, and thus the cardboard sheet S carried into the transport portion 21 is likely to laterally shift from the gap between the lower end portion of the side guide 33 and the upper surface of the feed table 34. Accordingly, when the cardboard sheet S is carried into the transport portion 21, the control device 83 drives and controls the drive motor 81 to elevate the grate 49 above the lower end portion of the side guide 33 by the elevating device 82. Then, when the cardboard sheet S reaches the upper surface of the grate 49, the left and right side portions of the cardboard sheet S appropriately abut against the side guides 33 and the cardboard sheet S is positioned in the Y direction. After the cardboard sheet S is carried into the transport portion 21, the control device 83 drives and controls the drive motor 81 to lower the grate 49 to an appropriate position by the elevating device 82.

Figure 9:
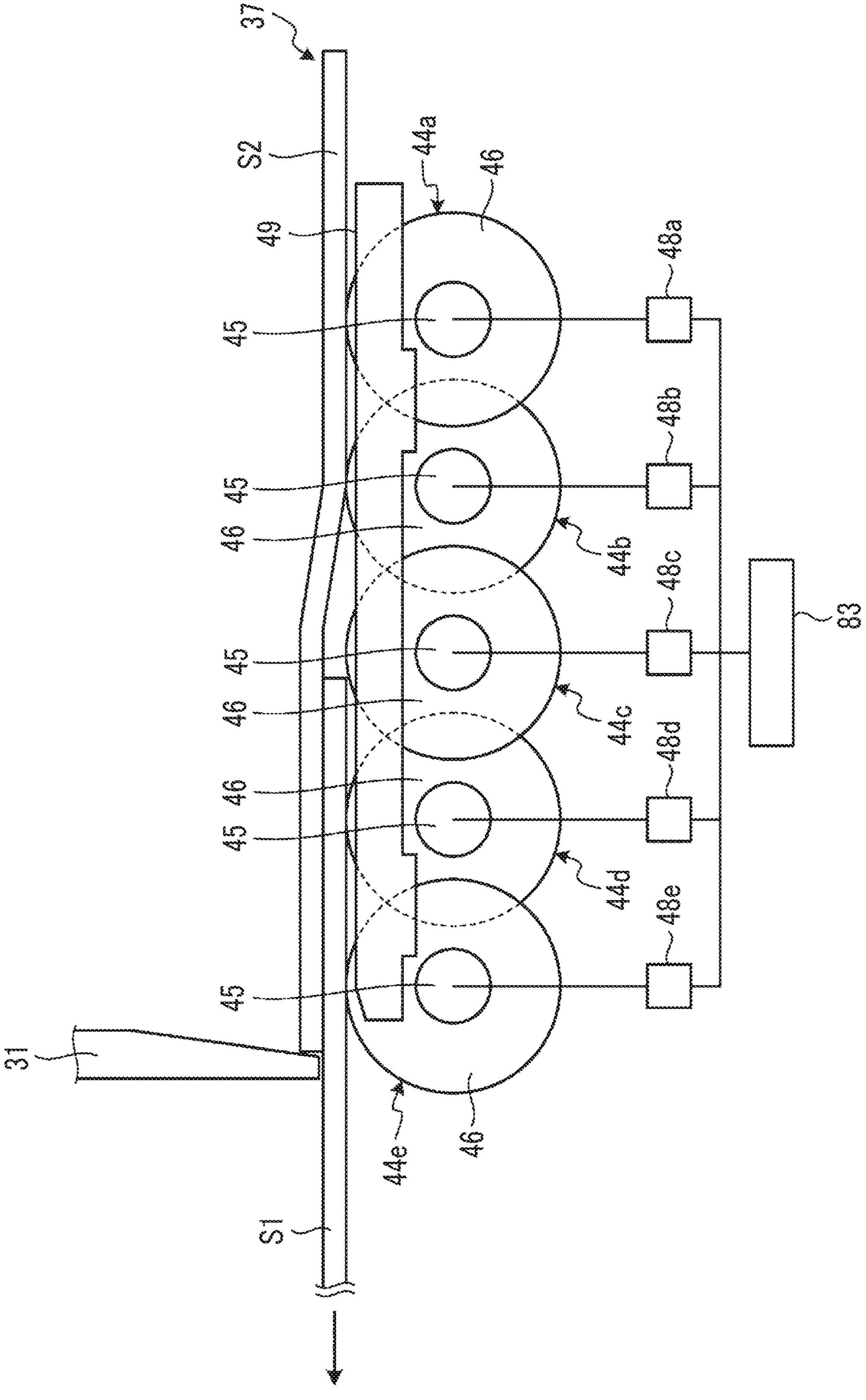
FIG. 9 is a schematic diagram for describing wheel main body control during cardboard sheet transport.

FIG. 9 is a schematic diagram for describing wheel main body control during cardboard sheet transport. As illustrated in FIG. 9, when the cardboard sheet S is transported by driving and rotating the plurality of wheels **44*a*, 44*b*, 44*c*, 44*d*, and 44*e*, the control device 83 stops the drive rotation of the wheels 44*a*, 44*b*, 44*c*, 44*d*, and 44*e*** that are not in contact with the cardboard sheet S in the process of transport.

In other words, when the plurality of wheels **44*a*, 44*b*, 44*c*, 44*d*, and 44*e* are driven and rotated, the wheels come into contact with the lower surface of a cardboard sheet S1 at the lowest position and the cardboard sheet S1 is ejected from below the front guide 31. At this time, the wheels 44*a* and 44*b* on the upstream side come out of contact as the plurality of wheels 44*a*, 44*b*, 44*c*, 44*d*, and 44*e* eject the cardboard sheet S1. Meanwhile, as the cardboard sheet S1 at the lowest position is ejected, the upstream end portion of a cardboard sheet S2 positioned above the cardboard sheet S1 hangs down. Then, the driven and rotated wheels 44*a* and 44*b* come into contact with the lower surface of the cardboard sheet S2. The cardboard sheet S2 is stopped with the downstream end portion of the cardboard sheet S2 abutting against the front guide 31. Accordingly, due to the contact between the stopped cardboard sheet S2 and the driven and rotated wheels 44*a* and 44*b*, the cardboard sheet S2 may be scratched or clogging at the front guide 31 may arise as the cardboard sheet S2** is about to be ejected. This phenomenon becomes particularly noticeable in a case where the cardboard sheet S is thin, long in the transport direction, or soft.

The control device 83 is capable of individually driving and rotating the plurality of wheels **44*a*, 44*b*, 44*c*, 44*d*, and 44*e* with the drive motors 48*a*, 48*b*, 48*c*, 48*d*, and 48*e*. Accordingly, when the plurality of wheels 44*a*, 44*b*, 44*c*, 44*d*, and 44*e* are driven and rotated to transport the cardboard sheet S1, the drive rotation of the wheels 44*a*, 44*b*, 44*c*, 44*d*, and 44*e* is stopped in order from the upstream wheel that has come out of contact with the cardboard sheet S1. Accordingly, damage to the cardboard sheet S2 and so on is prevented, even if the upstream end portion of the cardboard sheet S2 positioned above the cardboard sheet S1 hangs down and the wheels 44*a* and 44*b* come into contact with the lower surface of the cardboard sheet S2, since the wheels 44*a* and 44*b* are stopped. Although the drive rotation is stopped in order from the upstream wheel that is not in contact with the cardboard sheet S1, the wheel that stops being driven and rotated is not limited thereto in number and timing. For example, depending on the elevation timing of the grate 49, the drive rotation of only the wheels 44*a*** and

44*b* may be stopped in the order of coming out of contact with the cardboard sheet S1 and the drive rotation of the wheels 44*c*, 44*d*, and 44*e* may be stopped at the same time after the grate 49 is lifted. In addition, the wheel that stops being driven and rotated may be appropriately selected depending on the transport direction and size of the cardboard sheet S1.

The amount of wear of the wheel main body 46 can be the difference between the distances from the upper surface of the grate 49 to the upper edge of the outer peripheral portion of the wheel main body 46 at a time when the wheel main body 46 is not worn and at a time when the wheel main body 46 is worn. The distance to the upper edge of the outer peripheral portion of the wheel main body 46 may be a value measured by a known method such as diameter measurement by means of a sensor (not illustrated). In addition, the distance to the upper edge of the outer peripheral portion of the wheel main body 46 may be estimated from the period of use of the wheel main body 46. A lower limit value suitable for the calculated amount of wear may be derived in advance by experiment or the like.

[Action and Effect of Present Embodiment]

A paper sheet feeding apparatus according to a first aspect includes: a plurality of wheels 44*a*, 44*b*, 44*c*, 44*d*, and 44*e* capable of supplying a cardboard sheet S by coming into contact with a lower surface of the cardboard sheet S; a grate 49 liftable and lowerable to an ascending position positioned above upper edges of the plurality of wheels 44*a*, 44*b*, 44*c*, 44*d*, and 44*e* and a descending position positioned below the upper edges of the plurality of wheels; a drive motor 81; an elevating device 82 capable of lifting the grate 49 to the ascending position by rotating the drive motor 81 in one direction and capable of lowering the grate 49 to the descending position by rotating the drive motor 81 in the other direction; and a control device 83 capable of adjusting an amount by which the grate 49 is lifted and lowered by the elevating device 82 by controlling the drive motor 81.

In the paper sheet feeding apparatus according to the first aspect, the control device 83 is capable of lifting the grate 49 to the ascending position by rotating the drive motor 81 in one direction and is capable of lowering the grate 49 to the descending position by rotating the drive motor 81 in the other direction. In addition, the control device 83 is capable of adjusting the lifting/lowering amount of the grate 49 caused by the elevating device 82 by controlling the drive motor 81. Accordingly, the ascending position and the descending position of the grate 49 can be adjusted as needed and the stop position of the grate can be adjusted with ease.

In the paper sheet feeding apparatus according to a second aspect, the control device 83 is capable of adjusting the descending position of the grate 49 caused by the elevating device 82 by controlling the drive motor 81. As a result, the descending position of the grate 49 positioned below the upper edges of the plurality of wheel main bodies 46 can be adjusted, the lower surface of the cardboard sheet S and the outer peripheral portions of the plurality of wheel main bodies 46 can be appropriately brought into contact with each other, and the cardboard sheet S can be stably supplied by the plurality of wheels 44*a*, 44*b*, 44*c*, 44*d*, and 44*e*.

In the paper sheet feeding apparatus according to a third aspect, the control device 83 is provided with an operation device (input unit) 111 inputting an upper limit value from an origin position to the ascending position and a lower limit value from the origin position to the descending position. As a result, a worker can easily set the ascending position and the descending position of the grate 49 by inputting the upper limit value and the lower limit value with the operation device 111.

In the paper sheet feeding apparatus according to a fourth aspect, the lower limit value is set based on the amount of wear of the plurality of wheels 44*a*, 44*b*, 44*c*, 44*d*, and 44*e*. As a result, even if the wheel main bodies 46 in the plurality of wheels 44*a*, 44*b*, 44*c*, 44*d*, and 44*e* are worn due to long-term use, the positional relationship between the grate 49 and the upper edges of the plurality of wheels 44*a*, 44*b*, 44*c*, 44*d*, and 44*e* can be maintained well by changing the lower limit value. Accordingly, the life of the feeding section 11 can be extended by extending the replacement period of the wheel main body 46.

In the paper sheet feeding apparatus according to a fifth aspect, the elevating device 82 has an eccentric shaft 91 connected to an output shaft of the drive motor 81, the amount of linear motion generated by rotating the eccentric shaft 91 in one direction is converted into an ascending amount of the grate 49, and the amount of linear motion generated by rotating the eccentric shaft 91 in the other direction is converted into a descending amount of the grate 49. As a result, structural simplification can be achieved by lifting the grate 49 by the rotation of the eccentric shaft 91 in one direction caused by the drive motor 81 and lowering the grate 49 by the rotation of the eccentric shaft 91 in the other direction caused by the drive motor 81.

In the paper sheet feeding apparatus according to a fifth aspect, a combined rotation angle of the rotation of the eccentric shaft 91 in the one direction and the rotation of the eccentric shaft 91 in the other direction is within 180 degrees. As a result, the rotation region of the eccentric shaft 91 can be reduced to maintain a quick elevating operation of the grate 49.

In the paper sheet feeding apparatus according to a seventh aspect, the elevating device 82 has a drive rod 92 moving along a supply direction of the cardboard sheet S by a rotational motion of the eccentric shaft 91 and a plurality of L-shaped link members 93 rotatable around a supporting shaft 102 along a horizontal direction orthogonal to the supply direction of the cardboard sheet S, connected to the drive rod 92 in one end portion, and connected to the grate 49 in the other end portion. As a result, the grate 49 can be easily lifted and lowered to the ascending position and the descending position by means of a simple configuration.

In the paper sheet feeding apparatus according to an eighth aspect, a side guide 33 capable of coming into contact with a side portion of the cardboard sheet S is provided beside the plurality of wheels 44*a*, 44*b*, 44*c*, 44*d*, and 44*e*, and the control device 83 elevates the grate 49 above a lower end portion of the side guide 33 by the elevating device 82 by controlling the drive motor 81 when the cardboard sheet S is supplied to the plurality of wheels 44*a*, 44*b*, 44*c*, 44*d*, and 44*e*. As a result, the cardboard sheet S that has reached the upper surface of the grate 49 when the cardboard sheet S is carried into the transport portion 21 can be positioned in the Y direction with the left and right side portions of the cardboard sheet S appropriately abutting against the side guide 33.

In the paper sheet feeding apparatus according to a ninth aspect, the plurality of wheels 44*a*, 44*b*, 44*c*, 44*d*, and 44*e* are disposed along a transport direction of the cardboard sheet S (S1 and S2), the control device 83 is capable of individually driving and rotating the plurality of wheels 44*a*, 44*b*, 44*c*, 44*d*, and 44*e*, and, when the cardboard sheet S1 is transported by driving and rotating the plurality of wheels 44*a*, 44*b*, 44*c*, 44*d*, and 44*e*, the control device 83 stops the drive rotation of the wheels 44*a*, 44*b*, 44*c*, 44*d*, and 44*e* not in contact with the cardboard sheet S1 in the process of transport. As a result, the cardboard sheet S2 positioned above the cardboard sheet S1 in the process of transport comes into contact with the stopped wheels 44*a*, 44*b*, 44*c*, 44*d*, and 44*e* and damage to the cardboard sheet S2 can be prevented.

A box making machine according to a tenth aspect includes: a feeding section 11 where a cardboard sheet S is supplied; a printing section 12 where printing is performed on the cardboard sheet S; a slotter creaser section 13 where creasing line processing and grooving are performed on a surface of the cardboard sheet S; a folding section 15 where a box body is formed by folding the cardboard sheet S and joining an end portion; and a counter-ejector section 16 where every predetermined number of the corrugated boxes B are discharged after the corrugated boxes B are stacked while being counted. As a result, the control device 83 is capable of adjusting the lifting/lowering amount of the grate 49 caused by the elevating device 82 by controlling the drive motor 81 in the feeding section 11. Accordingly, the ascending position and the descending position of the grate 49 can be adjusted as needed and the stop position of the grate 49 can be adjusted with ease.

The present disclosure is not limited to the configuration of the above embodiment in which the elevating device 82 is configured by the eccentric shaft 91, the drive rod 92, and the link member 93. In addition, the shape of the grate 49 in the grate device 37 is not limited to the shape described in the embodiment.

In the embodiment described above, the box making machine 10 is configured by the feeding section 11, the printing section 12, the slotter creaser section 13, the die cutting section 14, the folding section 15, and the counter-ejector section 16. In a case where no hand hole is necessary in the cardboard sheet S, the configuration may lack the die cutting section 14.

REFERENCE SIGNS LIST

10: box making machine
11: feeding section (paper sheet feeding apparatus)
12: printing section
13: slotter creaser section
14: die cutting section
15: folding section
16: counter-ejector section
21: transport portion
22: feed roll
22*a*: upper feed roll
22*b*: lower feed roll
31: front guide
32: back stop
33: side guide
34: feed table
35: wheel assembly
36: suction portion
37: grate device
41*a*, 41*b*, 41*c*, 41*d*, 41*e*, 41*f*, 41*g*, 41*h*: suction box
42: duct
43: suction blower
44*a*, 44*b*, 44*c*, 44*d*, 44*e*: wheel
45: rotary shaft
46: wheel main body
47*a*, 47*b*, 47*c*, 47*d*, 47*e*: power transmission mechanism
48*a*, 48*b*, 48*c*, 48*d*, 48*e*: drive motor
49: grate
51: power transmission mechanism
52: drive motor
81: drive motor
82: elevating device
83: control device
91: eccentric shaft
92: drive rod
93: link member
101: connecting rod
102: supporting shaft
103, 104: connection shaft
111: operation device (input unit)
E: eccentricity amount
O: origin position
N, N1, N2, N3: rotation angle
M1: ascending amount
M2, M3, M4: descending amount
S, S1, S2: cardboard sheet
B: corrugated box

The invention claimed is:

1. A paper sheet feeding apparatus comprising:
a plurality of wheels capable of supplying a sheet by coming into contact with a lower surface of the sheet;
a grate liftable and lowerable to an ascending position positioned above upper edges of the plurality of wheels and a descending position positioned below the upper edges of the plurality of wheels;
a drive motor;
an elevating device capable of lifting the grate to the ascending position by rotating the drive motor in one direction and capable of lowering the grate to the descending position by rotating the drive motor in the other direction; and
a control device capable of adjusting an amount by which the grate is lifted and lowered by the elevating device by controlling the drive motor, wherein the control device is provided with an input unit inputting an upper limit value from an origin position to the ascending position and a lower limit value from the origin position to the descending position.

2. The paper sheet feeding apparatus according to claim 1, wherein the control device is capable of adjusting the descending position of the grate caused by the elevating device by controlling the drive motor.

3. The paper sheet feeding apparatus according to claim 1, wherein the lower limit value is set based on the amount of wear of the plurality of wheels.

4. The paper sheet feeding apparatus according to claim 1, wherein the elevating device has an eccentric shaft connected to an output shaft of the drive motor, an amount of linear motion generated by rotating the eccentric shaft in one direction is converted into an ascending amount of the grate, and the amount of linear motion generated by rotating the eccentric shaft in the other direction is converted into a descending amount of the grate.

5. The paper sheet feeding apparatus according to claim 4, wherein a combined rotation angle of the rotation of the eccentric shaft in the one direction and the rotation of the eccentric shaft in the other direction is within 180 degrees.

6. The paper sheet feeding apparatus according to claim 5, wherein the elevating device has a drive rod moving along a supply direction of the sheet by a rotational motion of the eccentric shaft and a plurality of L-shaped link members rotatable around an axis along a horizontal direction orthogonal to the sheet supply direction, connected to the drive rod in one end portion, and connected to the grate in the other end portion.

7. The paper sheet feeding apparatus according to claim 1, wherein a side guide capable of coming into contact with a side portion of the sheet is provided beside the plurality of wheels, and the control device elevates the grate above a lower end portion of the side guide by the elevating device by controlling the drive motor when the sheet is supplied to the plurality of wheels.

8. The paper sheet feeding apparatus according to claim 1, wherein the plurality of wheels are disposed along a transport direction of the sheet, the control device is capable of individually driving and rotating the plurality of wheels, and, when the sheet is transported by driving and rotating the plurality of wheels, the control device stops the drive rotation of the wheel not in contact with the sheet in the process of transport.

9. A box making machine comprising:

a feeding section where a box making sheet material is supplied;

a printing section where printing is performed on the box making sheet material;

a slotter creaser section where creasing line processing and grooving are performed on a surface of the box making sheet material;

a folding section where a box body is formed by folding the box making sheet material and joining an end portion; and a counter-ejector section where every predetermined number of the box bodies are discharged after the box bodies are stacked while being counted, wherein the paper sheet feeding apparatus according to claim 1 is applied as the feeding section.

10. The paper sheet feeding apparatus according to claim 1, wherein the control device is capable of adjusting the ascending position of the grate caused by the elevating device by controlling the drive motor.

* * * * *